United States Patent [19]

Norris

[11] 4,245,666
[45] Jan. 20, 1981

[54] COLLECTING DEVICE FOR CEILING LEAKS

[76] Inventor: Sarena K. Norris, 185 Lexington Ave., New York, N.Y. 10016

[21] Appl. No.: 23,888

[22] Filed: Mar. 26, 1979

[51] Int. Cl.³ .................. B01D 23/28; B65B 39/00; B67C 11/00; F16M 11/38
[52] U.S. Cl. ............................ 137/357; 248/94; 248/171; 141/337
[58] Field of Search ................. 137/312, 313, 357; 141/331, 375, 376, 337, 340, 341, 342, 334; 184/106, 1.5; 248/94, 171, 435

[56] References Cited

U.S. PATENT DOCUMENTS

| | | | |
|---|---|---|---|
| 137,731 | 4/1873 | Springer | 141/334 |
| 577,829 | 2/1897 | Brown | 248/94 |
| 1,305,627 | 6/1919 | Smith | 141/337 |
| 1,480,788 | 1/1924 | Sordillo | 248/171 |
| 2,023,007 | 12/1935 | Delano | 248/24 |
| 2,361,781 | 10/1944 | Lindsey et al. | 248/171 |
| 4,092,827 | 6/1978 | Schneider | 137/236 R |
| 4,180,094 | 12/1979 | Viragh | 137/362 |

FOREIGN PATENT DOCUMENTS 553584 1/1957 Belgium .................. 141/337

Primary Examiner—Martin P. Schwadron
Assistant Examiner—A. Michael Chambers
Attorney, Agent, or Firm—Edward F. Levy

[57] ABSTRACT

A collecting device for receiving and containing leaking water and falling debris of ceiling leaks. The device comprises a large collapsible funnel member, preferably of rectangular cross-section, a collapsible base for resting upon a floor surface beneath the leak, and an extensible post mounting the funnel member on the base. When a ceiling leak develops, the base is set on the floor surface therebelow, and the post is extended to position the funnel member close to the ceiling in the vicinity of the leak. A flexible drainage pipe is connected to the device below the funnel to carry collected water to a remote receptacle, sink on the like. A mesh screen is mounted at the bottom of the funnel member to collect falling debris while permitting the passage of water to the drainage pipe.

2 Claims, 4 Drawing Figures

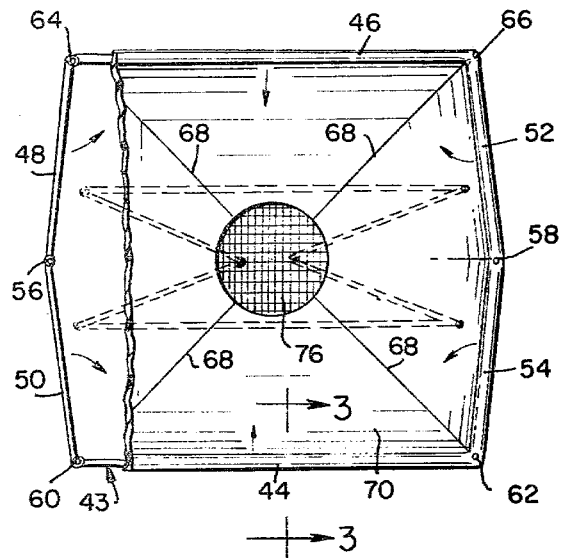
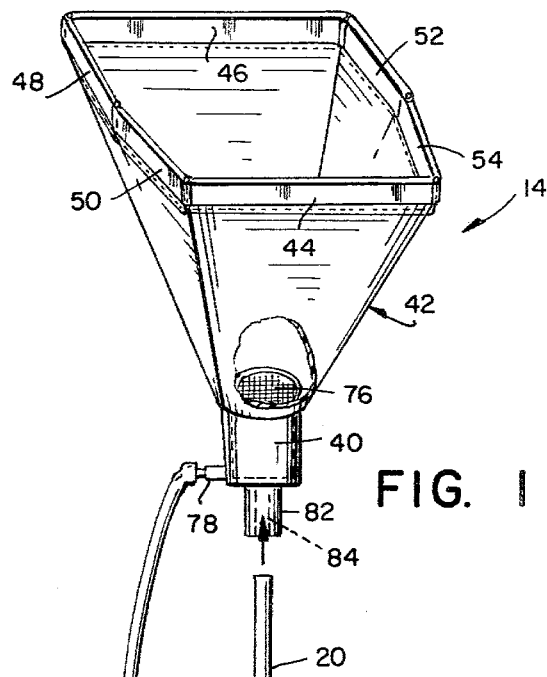
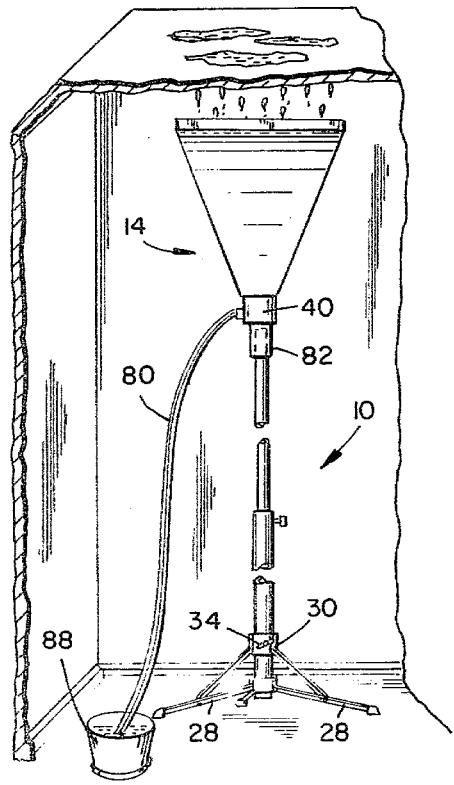
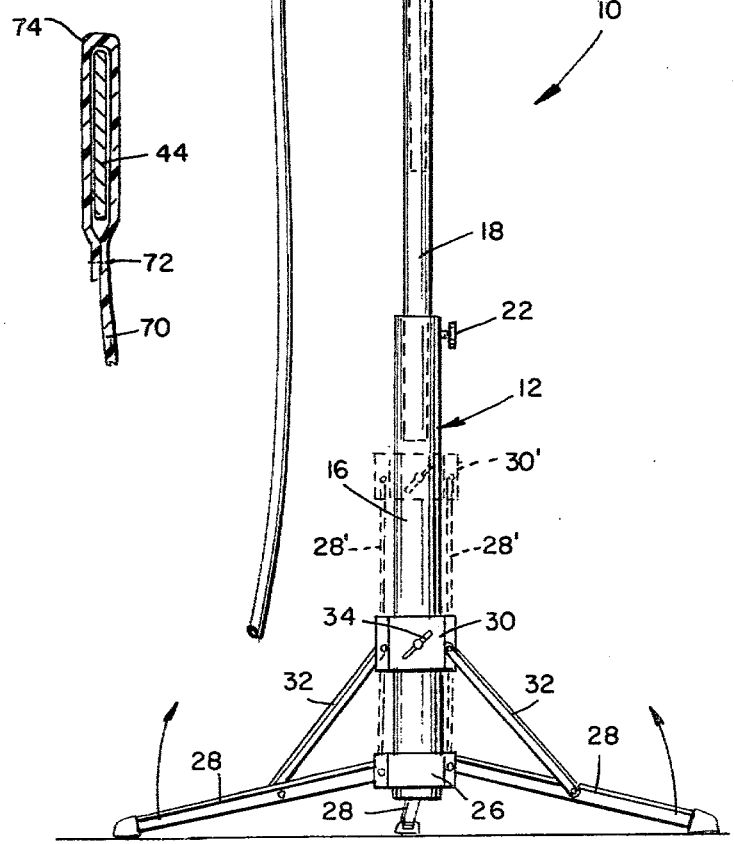

COLLECTING DEVICE FOR CEILING LEAKS

The present invention relates to apparatus for receiving and collecting water and debris falling from leaking ceilings, and in particular relates to a portable collector device which may be brought immediately beneath a ceiling leak and raised vertically adjacent the ceiling so as to receive and retain the water dripping from the leak as well as any plaster or other debris falling therefrom.

Ceiling leaks occur frequently in homes and in stores or other places of business, these leaks being caused by faulty pipes or plumbing with walls and ceilings, as well as by flooding in the room above that in which the ceiling leak occurs. When this situation exists, the water dripping from the ceiling leak accumulates on and causes damage to carpets, furniture, and other items within the room. In addition, the leak often ruptures and dislodges the plaster material of the ceiling; the falling pieces of plaster damaging furniture and often causing injury to occupants.

When ceiling leaks occur, it is the usual practice to place a pot, pan, bucket or other receptacle on the floor beneath the leak in order to catch the dripping water. This is generally found to be an ineffective remedy since the receptacle must be constantly attended and frequently emptied to prevent overflowing. Further, the leak tends to grow wider in area so that much of the dripping water misses the receptacle which has been placed on the floor therebeneath. Receptacles of this type are also unsuitable for catching falling plaster.

To eliminate the aforementioned problems, the invention herein contemplates the provision of a funnel-like device which may be set beneath a ceiling leak and adjusted in height so that the funnel-shaped collecting portion extends closely beneath the ceiling leak, thereby effectively collecting the water dripping from the leak, as well as falling plaster. The water collected in the funnel portion is constantly drained off by a flexible pipe leading to a sink or the like. The funnel portion is made collapsible so that the device may be stored in a compact flat form when not in use.

Funnel-shaped liquid collecting devices are known in the prior art, U.S. Pat. Nos. 1,994,844, 2,021,585 and 2,023,007 all showing draining and collecting devices in which a funnel member is vertically adjustable so as to be positioned close beneath the source of the draining fluid. In each of these patents, however, the draining and collecting devices are made for collecting drained crank case oil from automobiles and are not adopted to be used for containing ceiling leaks.

U.S. Pat. No. 3,003,666 shows apparatus for controlling leaks in walls. This apparatus consists of a fibrous mass attached to a wall beneath a crack through which water is leaking, with the fibrous mass conducting the leaking water by capillary action to a pail or other container. This apparatus is unsuitable for collecting and containing the water and debris emitted by ceiling leaks.

It is an object of the present invention to provide a portable device for receiving and collecting water and debris from ceiling leaks, thereby preventing such water and debris from falling to the floor, carpeting or furniture beneath the leaks.

Another object of the invention is to provide a collecting device of the character described which includes a large funnel-shaped collecting member which may be positioned immediately below the ceiling leak, the collecting member being adjustably mounted on the device and being capable of being raised so that it is located close beneath the ceiling leak.

Still another object of the invention is the provision of a collecting device of the type described in which the funnel shaped collecting member is collapsible so that the device may be conveniently stored in compact form when not in use.

A further object of the invention is the provision of a collecting device of the type described which includes means for draining away the water collected by the funnel-shaped member, and directing such water to a sink or the like, so that the device may be left unattended beneath a leak without danger of overflowing.

In accordance with the invention there is provided a collecting device for ceiling leaks comprising an extensible base section adapted to rest upon a floor surface beneath a ceiling leak and having an extensible rod movably mounted thereon for extension toward and away from said ceiling leak, and a collecting section mounted on the free upper end of said rod. The collecting section comprises a funnel member having an open top end and a bottom end of reduced cross-sectional area communicating with a hollow cup member mounted on the rod. An elongated flexible drainage pipe communicates with the hollow cup member.

In use, the base section is placed on a floor surface beneath a ceiling leak, and the rod is extended upwardly until the funnel member is located close to and immediately below the leak, so that water and debris from the leak is received by the funnel member. The water is drained off by the flexible drainage pipe to a sink or receptacle. A wire mesh screen mounted at the bottom of the funnel member serves to retain the solid plaster or other debris in the funnel member, while permitting water to drain off.

In a preferred embodiment, both the base member and funnel member are made collapsible so that the device may be stored when not in use. Additional objects and advantages of the invention will become apparent during the course of the following specification when taken in connection with the accompanying drawings in which:

FIG. 1 is a front perspective view of a collecting device made in accordance with the present invention, with a portion of the collecting member broken away to reveal inner construction;

FIG. 2 is a top plan view of the collecting device shown in FIG. 1;

FIG. 3 is an enlarged fragmentary section taken along line 3—3 of FIG. 2; and

FIG. 4 is a side elevational view of the device shown in extended operative position and located below a ceiling leak. Referring in detail to the drawings, there is shown in FIG. 1 a collecting device 10 made in accordance with the present invention and comprising a base section 12 supporting a collecting member 14.

The base section 12 constitutes a collapsible tripod, and includes a tubular standard 16 within which a tubular extension rod 18 is telescopically slidable. A solid extension rod 20 is telescopically slidable within the tubular extension rod 18. The parts are so dimensioned that the base section 12 may be brought to a retracted position in which the tubular extention rod 18 is substantially entirely received within the interior of the tubular standard 16 and the solid extension rod 20 is substantially entirely received within the tubular extension rod 18. The rods 18 and 20 may be extended from their retracted positions, as shown in FIG. 1, and releasably locked in extended position by respective set screws 22 and 24.

At the bottom end of the standard 16 there is mounted a ring 26 upon which the ends of three support legs 28 are pivotally mounted. A sleeve 30 is slidably mounted on the standard 16, and respective links 32 connect each of the support legs 28 to the sleeve 30. One end of each link 32 is pivotally mounted on the sleeve 30, and the other end thereof is pivotally mounted on an intermediate portion of a support leg 28. By means of this linkage, when the sleeve 30 is lowered toward the ring 26 to the position shown in full line in FIG. 1, the support legs 28 project radially outward from the standard 16 in extended positions for supporting the base section 12 and the collecting member 14 mounted thereon, in the usual manner of a tripod. The sleeve 30 may be releasably locked in this lowered position by a winged set screw 34.

When the sleeve 30 is raised along standard 16 to the elevated position shown in plantom at 30' in FIG. 1, the links 32 pivot to bring the legs 28 to the retracted position shown in phantom at 28'. In this retracted position, the legs 28 extend parallel to the standard 16 and are closely spaced therefrom, as shown. In this retracted position of the legs 28, the base section 12 is in compact form and may be conveniently stored.

The collecting member 14 comprises a hollow cylindrical cup 40 upon which is mounted a collapsible funnel member 42 having a rectangular top open end. The funnel member 42 includes a rectangular top frame 43 formed of a front metal strip 44, a rear metal strip 46, and two opposed pairs of hinged side strips 48,50 and 52,54. As shown in FIG. 2, the side strips 48 and 50 are connected together by a pivot pin 56, while the side strips 52 and 54 are connected together by a pivot pin 58. The front strip 44 is connected at its ends to the side strips 50 and 54 by respective pivot pins 60 and 62. Similarly, the rear strip 46 is connected at its ends to the side strips 48 and 52 by respective pivot pins 64 and 66. At each of its corners, the rectangular top fram 43 is connected to the cup 40 by elongated metal rods 68 which are semi-flexible.

The body of the funnel member 42 is formed by a sheet of water-impervious fabric or plastic material 70 which is mounted over the metal fram formed by strips 44–54 and rods 68. As shown in FIG. 3, the sheet 70 is folded over its upper end and stitched at 72 to form a loop 74 extending around the top metal frame 43 and enclosing the strips 44–54. The lower end portion of the sheet 70 is secured to the cup 40 with a water-tight connection. In its open position, shown in FIG. 1, the funnel member 42 has a large rectangular mouth at its top end, and its smaller lower end communicates with the cup 40.

The top open end of the cup 40, at its area of communication with the funnel member 42, is covered over by a sheet of wire mesh material 76 which prevents solid debris from passing into cup 40. At its lower end, the cup 40 is provided with an outlet opening communicating with a tube 78 to which is attached a flexible rubber pipe 80 of appropriate length. To the closed bottom wall of cup 40 is secured a socket member 82 having a bore 84 formed therein. The bore 84 is sized to receive the top end of the solid extension rod 20, whereby the funnel member 42 may be removably mounted on the base section 12.

When not in use, the collecting device 10 may be stored in flat, compact condition by removing the collecting member 14 from the base section 12, and collapsing the top frame 43 of the collecting member by pressing together the front and rear metal strips 44 and 46. This causes the pairs of side metal strips 48,50 and 52,54 to fold inwardly about the respective pivot pins 56 and 58, so that the frame 43 is brought to the flattened, collapsed position shown in phantom in FIG. 2. The base section 12 is also retracted by sliding the tubular extension rod 18 telescopically within the tubular standard 16, and sliding the solid extension rod 20 into the tubular extension rod 18. The support legs 28 are also brought to their retracted positions, shown at 28' in FIG. 1, by sliding the sleeve 30 upwardly upon standard 16.

When a ceiling leak develops, as indicated at 86 in FIG. 4, the collecting device 10 is brought out and assembled at the vicinity of the leak. The extension rods 18 and 20 are slid outwardly of the standard 16 to increase the height of base section 12, until the mouth of funnel member 42 is located close to the ceiling, immediately below the leak 86. With the funnel member in extended position, the leaking water is received therein and collects in the cup 40, from which it passes through tube 78 and pipe 80 to a sink, drain or receptacle 88 to which the pipe 80 leads. The funnel member 42 will also receive and retain pieces of plaster of other solid debris which falls from the ceiling, this solid matter being retained within the interior of the funnel member by the mesh screen 76 which prevents it from entering and clogging the cup 40.

While a preferred embodiment of the invention has been shown and described herein, it is obvious that numerous omissions charges and additions may be made in such embodiment without departing from the spirit and scope of the invention.

What is claimed is:

1. For use in collecting water and debris falling from a leak in the ceiling of a room, a collecting device for ceiling leaks, comprising a collapsible tripod member adapted to rest upon a floor surface beneath said ceiling leak and having a single extensible rod section mounted thereon and upstanding from said tripod member, said rod section comprising a tubular standard upstanding from said tripod member, a tubular extension rod telescopically slidable within said tubular standard, and a further extension rod telescopically slidable within said tubular extension rod, said rods being movable for extension toward and away from said ceiling leak, a collecting section mounted on the free upper end of said rod section and comprising a hollow cup member removably mounted on said rod section, and a collapsible funnel member having an open top end and a bottom end of reduced cross-sectional area communicating with said hollow cup member, said funnel member comprising a collapsible frame and a cover of water-impervious flexible material covering the sides of said frame, said collapsible frame comprising a plurality of metal strips hinged to each other and arranged to form an open rectangular frame section and to collapse to a flattened position, and a plurality of metal rods connected at one end to said metal strips and at the other end to said hollow cup member, and an elongated flexible drainage pipe communicating with said hollow cup member, the extensible rod section being of sufficient length, when extended, to position the open top end of the supported funnel member beneath and close to said ceiling leak, said drainage pipe being of sufficient length to carry the water, collected from said ceiling leak by said funnel, to a receptacle remote from said collecting device.

2. A collecting device according to claim 1 which also includes a wire mesh screen mounted at said bottom end of said funnel member and covering over said cup member.

* * * * *